(12) United States Patent
Maeda

(10) Patent No.: US 8,493,663 B2
(45) Date of Patent: Jul. 23, 2013

(54) OPTICAL SYSTEM AND OPTICAL APPARATUS HAVING THE SAME

(75) Inventor: Yuuki Maeda, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 149 days.

(21) Appl. No.: 12/848,314

(22) Filed: Aug. 2, 2010

(65) Prior Publication Data

US 2011/0038054 A1 Feb. 17, 2011

(30) Foreign Application Priority Data

Aug. 17, 2009 (JP) ................................. 2009-188460
Jul. 8, 2010 (JP) ................................. 2010-156009

(51) Int. Cl.
*G02B 9/00* (2006.01)
*G02B 13/04* (2006.01)

(52) U.S. Cl.
USPC ........................... 359/649; 359/749; 359/754

(58) Field of Classification Search
USPC ...................... 359/649–651, 749–753, 691
See application file for complete search history.

(56) References Cited

U.S. PATENT DOCUMENTS

| 7,589,905 | B2 * | 9/2009 | Sugita | 359/677 |
| 7,995,283 | B2 * | 8/2011 | Wada | 359/682 |
| 2002/0005994 | A1 | 1/2002 | Shikama | |

FOREIGN PATENT DOCUMENTS

JP 2008-158159 A 7/2008

* cited by examiner

*Primary Examiner* — Jordan Schwartz
(74) *Attorney, Agent, or Firm* — Rossi, Kimms & McDowell LLP

(57) ABSTRACT

An optical system includes, in order from an enlargement conjugate side to a reduction conjugate side via a largest air gap, a front unit having a negative power, and a rear unit having positive power. The optical system satisfies $1.75 < Nd_{n1} < 2.05$, $0.02 < \theta gF_{n1} - (0.6438 - 0.001682 \times vd_{n1}) < 0.08$, and $2.5 < |f_{n1}/F| < 5.0$, where $f_{n1}$ represents a focal length of a negative lens in the front unit, $Nd_{nl}$ represents a refractive index of a material of the negative lens, $vd_{n1}$ represents an Abbe number of the material of the negative lens, $\theta gF_{n1}$ represents a partial dispersion ratio of the material of the negative lens, and F represents a focal length of the optical system.

7 Claims, 6 Drawing Sheets

US 8,493,663 B2

OPTICAL SYSTEM AND OPTICAL APPARATUS HAVING THE SAME

BACKGROUND OF THE INVENTION

1. Field of the Invention

The present invention relates to an optical system, and is suitable, for example, for a projection optical system configured project image information onto a predetermined surface for a liquid crystal projector or an image pickup optical system of a camera.

2. Description of the Related Art

An optical system for a liquid crystal projector is demanded to be a high angle-of-view projection optical system configured to project a high definition image on a large screen with a small distance. An optical system for an image pickup apparatus, such as a camera, is demanded to be an image pickup optical system having a long back focal length, a high image quality, and a high angle of view configured to shoot a wide subject range. In order to obtain a high definition projected image and a high quality captured image, a color shift (or chromatic aberration) mitigation among a variety of aberrations of an optical system is important. In general, using a lens made of anomalous dispersion glass is effective to correct the chromatic aberration while maintaining a size of the entire optical system.

On the other hand, for the optical system having a wide angle of view, it is effective to configure the entire lens system to be a retrofocus type in which a lens unit of a negative power is located on the enlargement conjugate side (the object side). U.S. Patent Publication Application No. 2002/0005994 proposes a retrofocus type optical system configured to correct a chromatic aberration using a lens made of anomalous dispersion glass. However, simply using a lens made of an optical material of the anomalous dispersion for the optical path has a difficulty in obtaining a good performance over a screen while well correcting the chromatic aberration.

SUMMARY OF THE INVENTION

An optical system according to the present invention includes, in order from an enlargement conjugate side to a reduction conjugate side via a largest air gap, a front unit having a negative power, and a rear unit having positive power. The optical system satisfies $1.75 < Nd_{n1} < 2.05$, $0.02 < \theta gF_{n1} - (0.6438 - 0.001682 \times vd_{n1}) < 0.08$, and $2.5 < |f_{n1}/F| < 5.0$, where $f_{n1}$ represents a focal length of a negative lens in the front unit, $Nd_{n1}$ represents a refractive index of a material of the negative lens, $vd_{n1}$ represents an Abbe number of the material of the negative lens, $\theta gF_{n1}$ represents a partial dispersion ratio of the material of the negative lens, and F represents a focal length of the optical system.

Further features of the present invention will become apparent from the following description of exemplary embodiments with reference to the attached drawings.

DESCRIPTION OF THE EMBODIMENTS

A description will now be given of an optical system according to the present invention and several embodiments of an optical apparatus, such as an image projector and an image pickup apparatus. The optical system of the present invention is an optical system having a single focal length or a zoom lens having a zooming operation, which includes, in order from an enlargement conjugate side to a reduction conjugate side, a front unit having a negative power, and a rear unit having a positive power.

Figure 1:
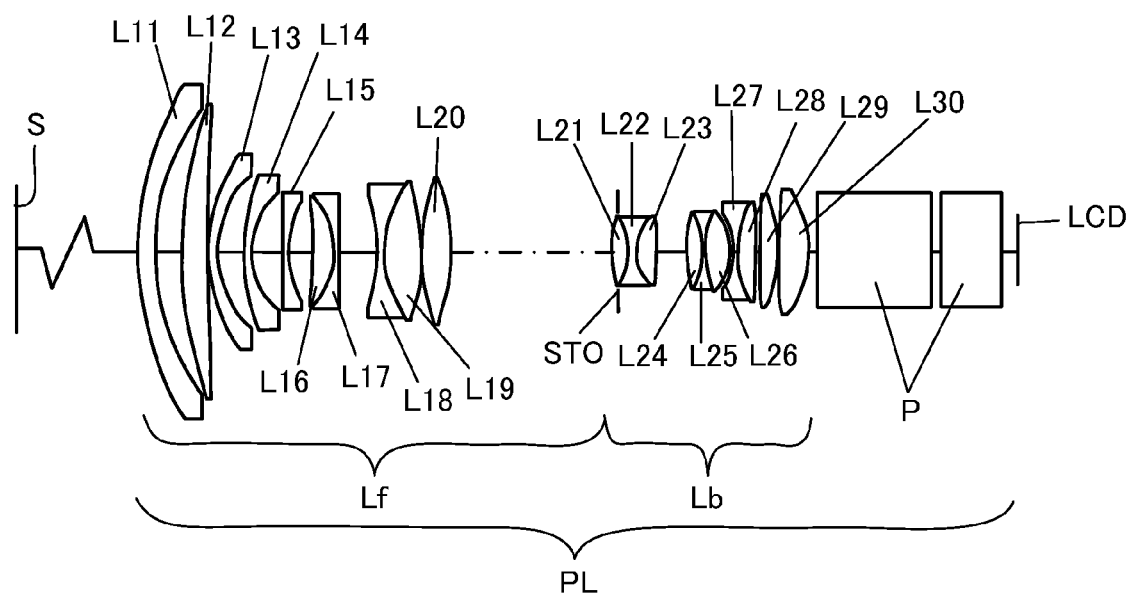
FIG. 1 is a lens sectional view of a first embodiment.
Figure 2A:
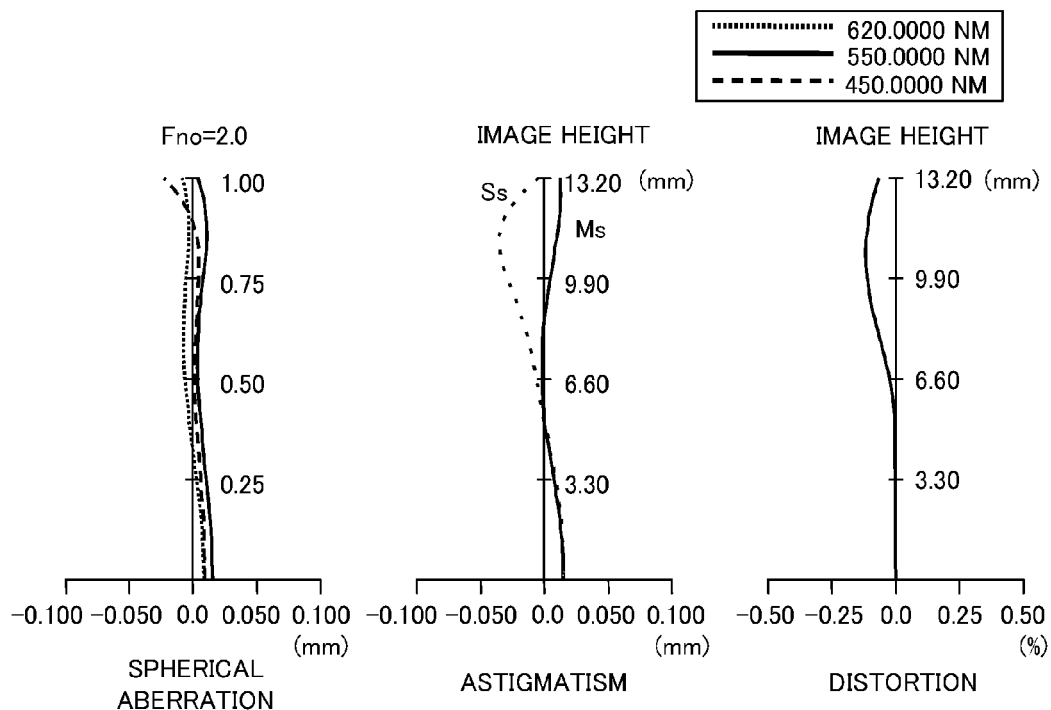
FIG. 2 shows a variety of aberrations and a chromatic difference of magnification diagram of the first embodiment.
Figure 2B:
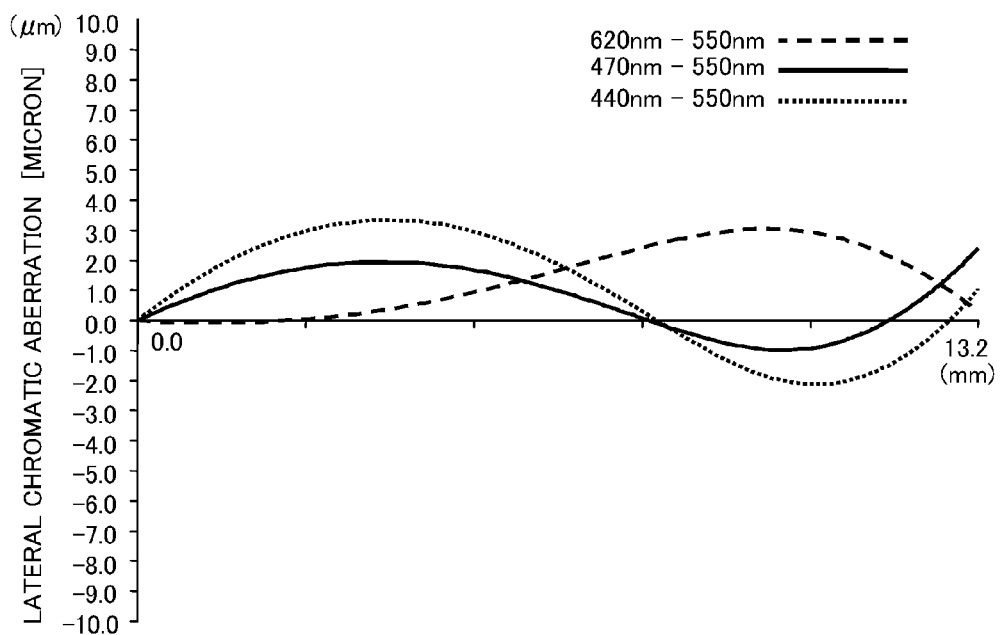

FIG. 1 is a schematic principal diagram of a first embodiment when the optical system of the present invention is used for a projection optical system for an image projector. FIGS. 2A and 2B are a lateral aberration diagram and a chromatic difference of magnification (lateral chromatic aberration) diagram where a distance to a screen (or a distance from a first lens surface) is 1050 [mm] in the first embodiment. FIG. 2A is a lateral aberration diagram that represents a spherical aberration, an astigmatism, and a distortion. A dotted line, a solid line, and a broken line in the spherical aberration represent aberrations for wavelengths of 620 nm, 550 nm, and 450 nm, respectively. The astigmatism represents an aberration for a wavelength of 550 nm, the solid line represents a meridional section (S), and a broken line represents an aberration on a sagittal section. The distortion represents an aberration for a wavelength of 550 nm. FIG. 2B is a lateral aberration diagram of a chromatic difference of magnification, where an abscissa axis denotes an axis perpendicular to the optical axis. The chromatic difference of magnification is based on 550 nm, and a broken line, a solid line, and a dotted line represent aberrations for wavelengths of 620 nm, 470 nm, and 440 nm, respectively. The aberrational diagrams illustrated in FIGS. 2, 4, and 6 are aberrational diagrams when a liquid crystal display (LCD) is located at a position that provides a maximum MTF for a wavelength of 550 nm.

Figure 3:
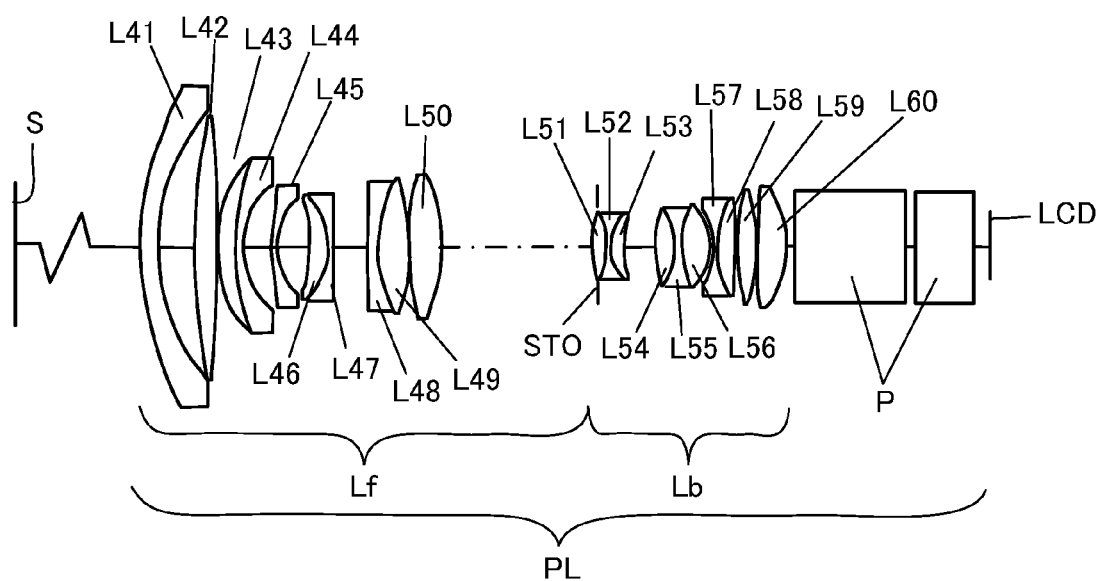
FIG. 3 is a lens sectional view of a second embodiment.
Figure 4A:
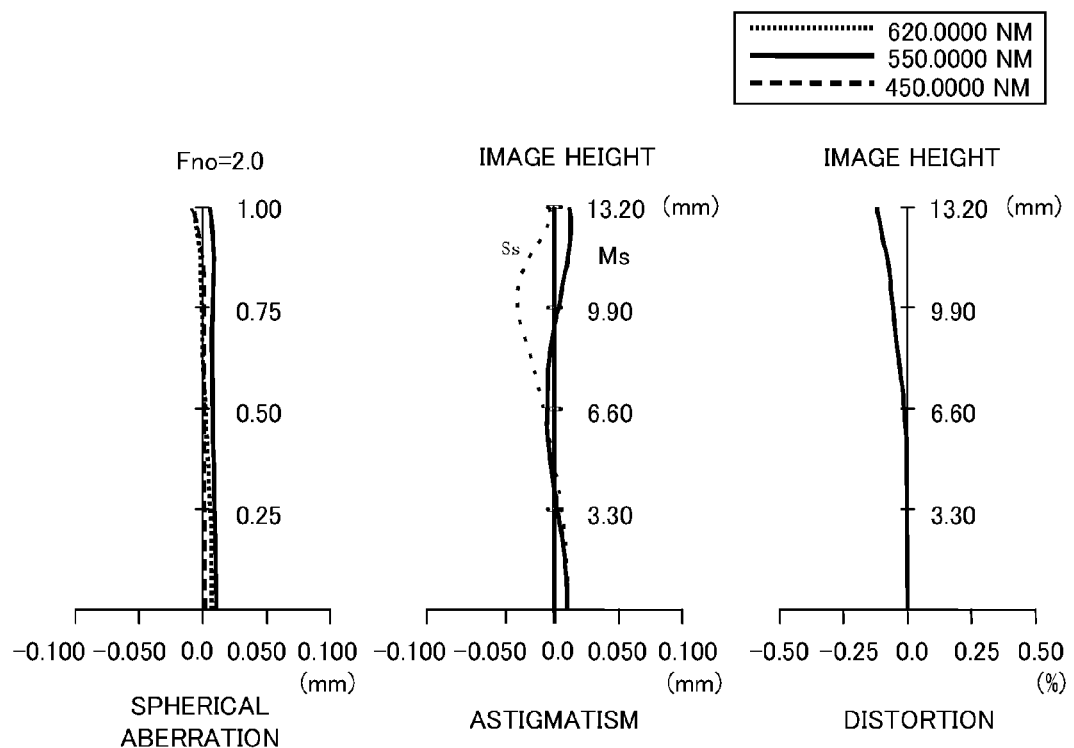
FIG. 4 shows a variety of aberrations and a chromatic difference of magnification diagram of the second embodiment.
Figure 4B:
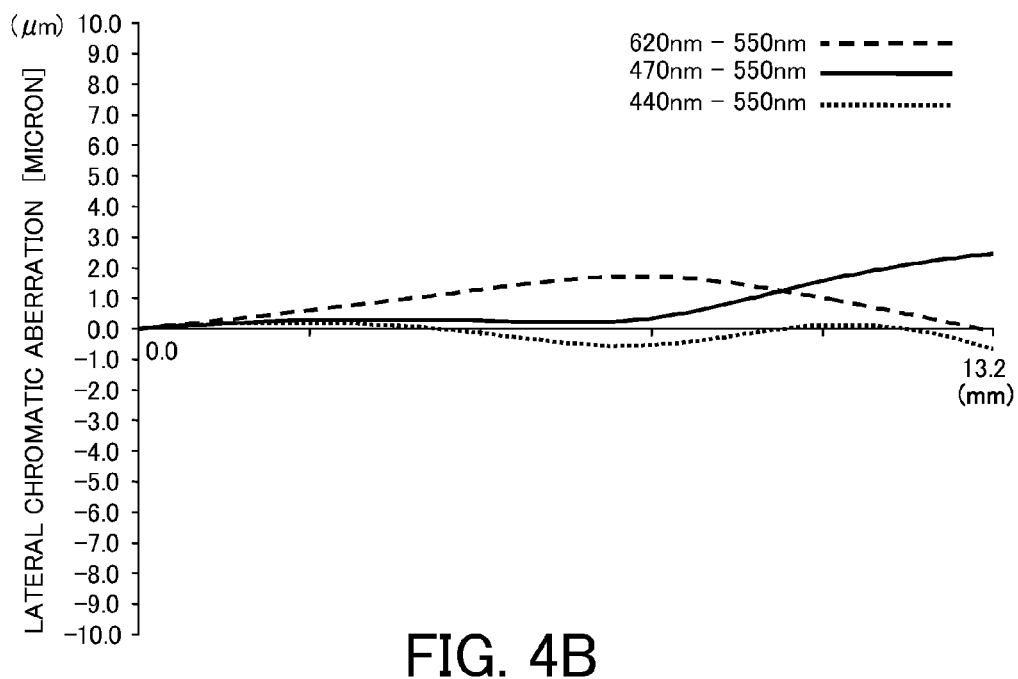
Figure 5:
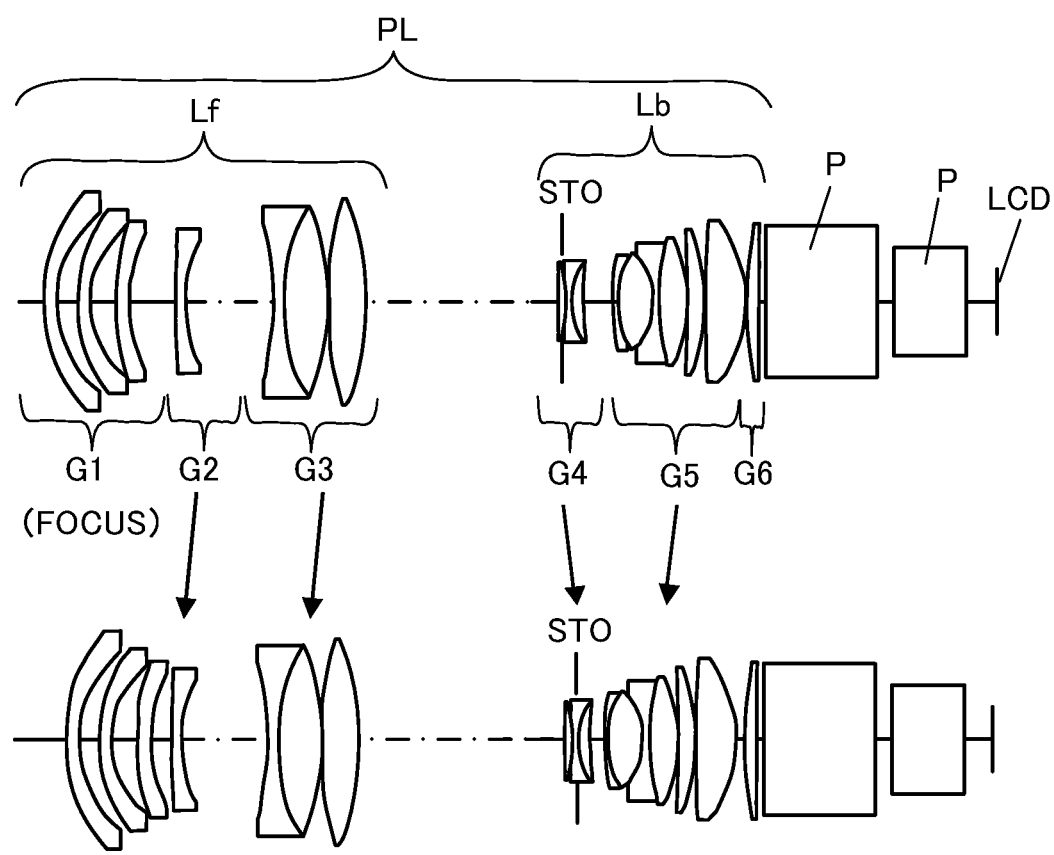
FIG. 5 is a lens sectional view of a third embodiment.
Figure 6A:
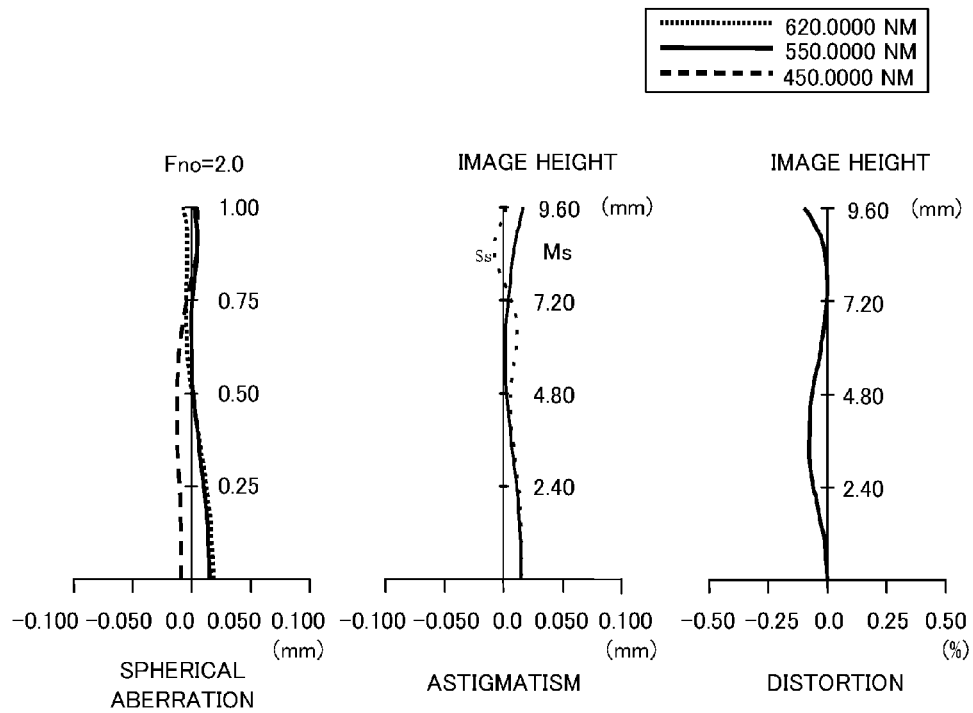
FIG. 6 shows a variety of aberrations and a chromatic difference of magnification diagram of the third embodiment.
Figure 6B:
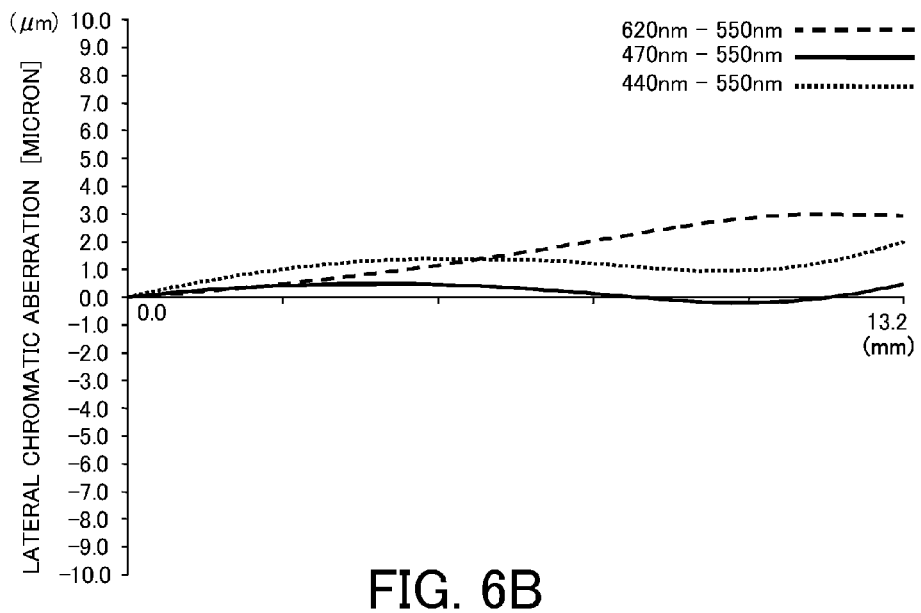

FIG. 3 is a schematic principal view of a second embodiment when the optical system of the present invention is used for a projection optical system for an image projector. FIGS. 4A and 4B are a lateral aberration diagram and a chromatic difference of magnification diagram when a distance to the screen (distance from the first lens surface) is 1050 [mm] in the second embodiment. FIG. 5 is a schematic principal view of a third embodiment when the optical system according to the present invention is used for a projection optical system for an image projector. FIGS. 6A and 6B are a lateral aberration diagram and a chromatic difference of magnification diagram when a distance to the screen (distance from the first lens surface) is 1210 [mm] in the third embodiment.

In the image projector of each embodiment, an original image (projected image) to be displayed on a LCD panel is enlarged and projected on a screen surface S using an optical system (projection lens) PL. On the lens sectional view, S denotes a screen surface (projection surface), LCD is a liquid crystal display panel or device, located on an image plane of the optical system PL. The screen surface S and the LCD panel have a conjugate relationship with each other. When a distance from the object side principal plane to a conjugates point is compared with a distance from the image side principal plane to the conjugate point, the screen surface S generally corresponds to the conjugate point of a longer distance on the enlargement side (front side or enlargement conjugate side). The LCD panel corresponds to the conjugate point of a shorter distance backside or reduction conjugate side). When the optical system PS is used for the image pickup optical system, the screen S surface side corresponds to the object side and the LCD panel corresponds to the image side (IP).

The optical system PL of the first or second embodiments in FIG. 1 or 3 is a so-called retrofocus type having a single focal length, and includes a front unit Lf having a negative power, and a rear unit Lb having a positive power. A symbol Lij represents each lens. STO denotes a stop. In the embodiments illustrated in FIGS. 1 and 3, a lens holder frame configured to hold a lens serves as the stop STO, but may be provided separate from it. "P" denotes a color separation prism, color synthesis prism, a polarization filter, a color filter, etc., and it is a glass block provided for purposes of the optical design. The optical system PL is installed in the image projector body (not illustrated) via a connector (not illustrated). The glass block is included in a projector body on the LCD panel side after the glass block P.

The optical system PL of the third embodiment in FIG. 5 is a zoom lens. The optical system PL of the third embodiment includes a front unit Lf having a negative power and a rear unit Lb having a positive power. A symbol Gi denotes an i-th lens unit. The front unit Lf includes, in order from an enlargement conjugate side to a reduction conjugate side, a first lens unit G1 having a negative power, a second lens unit G2 having a negative power, and a third lens unit G3 having a positive power. The rear unit Lb includes a fourth lens unit G4 having a negative power, a fifth lens unit G5 having a positive power, and a sixth lens unit G6 having a positive power.

The optical system PL of this embodiment is a retrofocus type six-unit zoom lens in which a first lens unit G1 to a fifth lens unit G5 are moved on the optical axis in zooming. STO in FIG. 5 denotes a stop. In the embodiment illustrated in FIG. 5, a lens holder frame configured to hold a lens serves as the stop STO, but may be provided separate from it. "P" denotes a color separation prism, color synthesis prism, a polarization filter, a color filter, etc., and it is a glass block provided on the optical design. The optical system PL is installed in the image projector body (not illustrated) via a connector (not illustrated). The glass block is included in a projector body on the LCD panel side after the glass block P.

It is assumed in the optical system of each embodiment that at least one negative lens $L_{n1}$ included in the front unit Lf has a focal length of $f_{n1}$, and a material of the at least one negative lens $L_{n1}$ has a refractive index of $Nd_{n1}$, an Abbe number of $vd_{n1}$, and a partial dispersion ratio of $\theta gF_{n1}$. In addition, it is assumed that the focal length of the entire optical system is F (where the optical system has a zoom lens, the focal length means one at the wide angle end). Then, the at least one negative lens $L_{n1}$ satisfies the following conditional equations:

$$1.75 < Nd_{n1} < 2.05 \quad (1)$$

$$0.02 < \theta gF_{n1} - (0.6438 - 0.001682 \times vd_{n1}) < 0.08 \quad (2)$$

$$2.5 < |f_{n1}/F| < 5.0 \quad (3)$$

In order to properly correct the chromatic difference of magnification and to maintain the size of the entire optical system in the retrofocus type optical system, it is effective to use a glass material (optical material) of an anomalous dispersion for a negative lens in the front unit having a negative power (negative lens unit). In the retrofocus type optical system, the incidence height of an off-axis ray of the front unit is higher than that of the rear unit and an incidence height of the on-axis ray is not so high. Therefore, the chromatic difference of magnification can be corrected without significantly affecting the on-axis aberration.

In addition, as the negative lens made of an anomalous dispersion material has a larger power in the retrofocus type optical system, the secondary spectrum of the axial chromatic aberration (longitudinal chromatic aberration) deteriorates. On the other hand, as the negative lens made of the anomalous dispersion material has a smaller power, the correction effect to the secondary spectrum of the chromatic difference of magnification reduces.

Based on this aberration correcting principle, this embodiment properly corrects the chromatic aberration using the negative lens $L_{n1}$ that satisfies the conditional equations (1) to (3). Here, the Abbe number vd and the partial dispersion ratio $\theta gF$ are defined as follows where Ng, Nd, NF, and NC are the refractive indexes of the material for the g line, d line, F line, and C line, respectively:

$$vd = (Nd-1)/(NF-NC)$$

$$\theta gF = (Ng-NF)/(NF-NC)$$

When a value departs from the lower limit in the conditional equation (1), the negative lens $L_{n1}$ needs the same power and thus the radius of curvature of each lens surface needs to be smaller. Then, a large amount of high order aberration occurs in an aberration caused by the off-axis ray, such as a chromatic difference of magnification and astigmatism, and it becomes difficult to obtain a proper optical performance. When values exceed the upper limits in the conditional equation (1) and (2), an available type of the optical material reduces and thus it becomes difficult to obtain a proper material. In addition, only materials that are hard to process, such as resin materials, are available, thus the productivity reduces, and it becomes difficult to stably maintain the optical performance of the negative lens $L_{n1}$.

When the value becomes lower than the lower limit of the conditional equation (2), the correction effect to the secondary spectrum of the chromatic difference of magnification reduces, the chromatic difference of magnification excessively occurs, and it becomes difficult to obtain a proper optical performance.

When the value becomes lower than the lower limit of the conditional equation (3), the secondary spectrum in the axial chromatic aberration enlarges, the chromatic aberration deteriorates, and it becomes difficult to obtain a sufficient optical performance. When the value becomes higher than the upper limit in the conditional equation (3), the correction effect to the secondary spectrum of the chromatic difference of magnification reduces, the chromatic difference of magnification excessively occurs, and it becomes difficult to obtain a proper optical performance.

Each embodiment provides a retrofocus type optical system having a good imaging performance by restraining a chromatic difference of magnification and an axial chromatic aberration using the above configurations. In the meanwhile, in each embodiment, the numerical ranges of the conditional equations (1) to (3) may be set as follows:

$$1.78 < Nd_{n1} < 2.00 \quad (1a)$$

$$0.022 < \theta gF_{n1} - (0.6438 - 0.001682 \times vd_{n1}) < 0.060 \quad (2a)$$

$$2.8 < |f_{n1}/F| < 4.8 \quad (3a)$$

The optical system of each embodiment obtains a high optical performance by properly correcting a variety of aberrations containing the chromatic aberration. More specifically, this embodiment uses a negative lens made of a glass material having a larger partial dispersion ratio $\theta gf$ than that of a standard glass material for a front unit having a negative refractive index. In addition, this embodiment properly corrects the secondary spectra of the chromatic difference of magnification and the axial chromatic aberration entirely by using the negative lens having a reasonable power. A description will now be given of conditions used to more effectively obtain the proper optical performance in the optical system of each embodiment.

It is assumed that $L_f$ is a distance from a lens surface closest to the enlargement conjugate side in the front surface to a lens surface closest to the enlargement conjugate side in the rear unit Lb. Then, the at least one negative lens $L_{n1}$ that satisfies the conditional equations (1) to (3) may be located between a distance of 0.2 $L_f$ and a distance of 0.7 $L_f$ from the lens surface closest to the enlargement conjugate side toward the reduction conjugate side. This configuration facilitates a well correction of the chromatic difference of magnification. When the position of the negative lens $L_{n1}$ shifts from the lower limit of the distance of 0.2 $L_f$, the off-axis principal ray becomes excessively high, a large amount of astigmatism and a large amount of distortion occur, and thus it is difficult to obtain a good optical performance. On the other hand, when the position of the negative lens $L_{n1}$ shifts from the upper limit of the distance of 0.7 $L_f$, the off-axis principal ray becomes excessively low and it becomes difficult to obtain a sufficient correction effect to the secondary spectrum of the chromatic difference of magnification even when the power is made stronger. In addition, since the on-axis ray becomes higher, the secondary spectrum of the axial chromatic aberration deteriorates.

Where $f_{p1}$ represents a focal length of at least one positive lens $L_{p1}$ in the positive lens contained in the rear unit Lb, $vd_{p1}$ represents its Abbe number, and $\theta gF_{p1}$ represents its partial dispersion ratio, the following conditional equations are met:

$$75 < vd_{p1} < 99 \qquad (4)$$

$$0.02 < \theta gF_{p1} - (0.6438 - 0.001682 \times vd_{p1}) < 0.08 \qquad (5)$$

$$f_{p1}/F < 5.0 \qquad (6)$$

When the value is lower than the lower limit in the conditional equation (4), the dispersion becomes so large that a large amount of axial chromatic aberration and a large amount of chromatic difference of magnification occur, and thus it is difficult to obtain a good optical performance. When the value exceeds the upper limit in the conditional equation (4) or (5), for the same reason of the shift of the upper limit of the above conditional equation (1), it is difficult to stably supply the required optical performance. When the value is lower than the lower limit in the conditional equation (5), the anomalous dispersion becomes so small that the correction effect to the secondary spectrum of the axial chromatic aberration and the chromatic difference of magnification reduces, thus the excessive chromatic aberration occurs, and it is difficult to obtain a good optical performance. When the value exceeds the upper limit value in the conditional equation (6), the power of the positive lens $L_{p1}$ reduces, the correction effect to the secondary spectrum of the axial chromatic aberration and the chromatic difference of magnification reduces, and thus it becomes difficult to obtain a sufficient correction effect.

In each embodiment, the numerical ranges of the conditional equations (4) to (6) may be set as follows:

$$78 < vd_{p1} < 90 \qquad (4a)$$

$$0.025 < \theta gF_{p1} - (0.6438 - 0.001682 \times vd_{p1}) < 0.060 \qquad (5a)$$

$$1.5 \le f_{p1}/F < 3.5 \qquad (6a)$$

In each embodiment, more effective conditions will be described.

Assume that an i-th positive lens counting from the enlargement conjugate side toward the reduction conjugate side has a focal length of $f_{pi}$ and a partial dispersion ratio of its material of $\theta gF_{pi}$. Assume that the i-th negative lens counting from the enlargement conjugate side toward the reduction conjugate side has a focal length of $f_{ni}$ and a partial dispersion ratio of its material of $\theta gF_{ni}$. Assume that $\Sigma(\theta gF_{pi}/f_{pi})$ represents a sum of a value $(\theta gF_{pi}/f_{pi})$ with respect to the positive lens in the optical system PL, and $\Sigma(\theta gF_{ni}/f_{ni})$ represents a sum of a value $(\theta gF_{ni}/f_{ni})$ with respect to the negative lens in the optical system PL. Assume that $\Sigma(1/f_{pi})$ represents a sum of a value $(1/f_{pi})$ with respect to the positive lens in the optical system PL, and $\Sigma(1/f_{ni})$ represents a sum of a value $(1/f_{ni})$ with respect to the negative lens in the optical system PL. Assume that $Q_p = \Sigma(\eta gF_{pi}/f_{pi})/\Sigma(1/f_{pi})$ and $Q_n = \Sigma(\theta gF_{ni}/f_{ni})/\Sigma(1/f_{ni})$ where $Q_p$ represents an average anomalous dispersion value of the positive lens in the optical system PL and $Q_n$ represents an average anomalous dispersion value of the negative lens included in the optical system PL. Then, the following condition may be met:

$$|Q_p - Q_n| < 0.02 \qquad (7)$$

The average anomalous dispersion value $Q_p$ represents a numerical value made by averaging the partial dispersion ratio $\theta gF$ by a power of the positive lens (inverse of the focal length fp), and the average anomalous dispersion value $Q_n$ represents a numerical value made by averaging $\theta gF$ by a refractive index of the negative lens. When the value deviates from the conditional equation (7), the correction effect to the chromatic aberration tends to be insufficient or excessive, and thus the conditional equation (7) may be satisfied so as to maintain a good optical performance. The numerical range of the conditional equation (7) may be set as follows:

$$|Q_p - Q_n| < 0.01 \qquad (7a)$$

In each embodiment, more effective conditions will be described.

The following conditions may be met where L is a distance from a lens surface closest to the enlargement conjugate side in the front unit Lf to a lens surface closest to the reduction conjugate side in the rear unit Lb. At least one negative lens is located within a distance of ±0.1 L from a lens surface closest to the enlargement conjugate side in the rear unit Lb, and $\theta gF_{n2}$ represents a partial dispersion ratio of a negative lens $L_{n2}$ having the strongest power in the at least one negative lens. At least one positive lens is located within a distance of ±0.1 L from a lens surface closest to the enlargement conjugate side in the rear unit Lb, and $\theta gF_{p2}$ represents a partial dispersion ratio of a positive lens $L_{p2}$ having the strongest power in the at least one positive lens:

$$\theta gF_{n2} < 0.560 \qquad (8)$$

$$\theta gF_{p2} > 0.590 \qquad (9)$$

Here, a sign of the distance is set negative when it is measured on the enlargement conjugate side, and positive when it is measured on the reduction conjugate side. The secondary spectrum of the axial chromatic aberration is well corrected without significantly affecting the chromatic difference of magnification by arranging the negative lens that satisfies the conditional equation (8) and the positive lens that satisfies the conditional equation (9), near the lens surfaces closest to the enlargement conjugate side in the rear unit Lb in which the incident height of the off-axial principal ray is low.

When the value is higher than the upper limit of the conditional equation (8) or the lower limit of the conditional equation (9), the correction effect to the secondary spectrum of the axial chromatic aberration tends to be insufficient and it is difficult to obtain a sufficient optical performance. More specifically, the following numerical values of the conditional equations may be set.

$$\theta gF_{n2} < 0.557 \quad (8a)$$

$$\theta gF_{p2} > 0.600 \quad (9a)$$

In each embodiment, more effective conditions will be described.

When it is assumed that BF represents an air-equivalent back focus (back-focus, back-focus length), the following condition may be met:

$$BF/F > 3.5 \quad (10).$$

The back-focus is a distance from the lens surface closest to the reduction conjugate side to the imaging surface.

The conditional equation (10) can provide a back focal length necessary to arrange the color separation device (such as a polarization beam splitter and a dichroic prism) between the optical system and the LCD panel arranged at the reduction conjugate side. More specifically, the numerical value of the conditional equation (10) may be set as follows:

$$BF/F > 3.60 \quad (10a)$$

A description will now be given of a characteristic of a lens configuration of each embodiment.

First Embodiment

An optical system of a first embodiment includes, in order from the enlargement conjugate side, a front unit Lf having a negative refractive index, a stop STO, and a rear unit Lb having a positive power. The front unit Lf includes, in order from the enlargement conjugate side, ten lenses L11 to L20 or a negative lens, a positive lens, a negative lens, a negative lens, a negative lens, a positive lens, a negative lens, a negative lens, a positive lens, and a positive lens. The rear unit Lb includes, in order from the enlargement conjugate side, ten lenses L21 to L30 or a positive lens, a negative lens, a positive lens, a positive lens, a negative lens, a positive lens, a negative lens, a positive lens, a positive lens, a positive lens. The negative lens $L_{n1}$ corresponds to the negative lens L18, and the positive lens $L_{p1}$ corresponds to the positive lenses L26 and L30. The negative lens $L_{n2}$ corresponds to the negative lens L22, and the positive lens $L_{p2}$ corresponds to the positive lens L23.

Second Embodiment

Similar to the first embodiment, the optical system of a second embodiment includes a front unit Lf including ten lenses L41 to L50, and a rear unit Lb including ten lenses L51 to L60. The negative lens $L_{n1}$ corresponds to the negative lens L48, and the positive lens $L_{p1}$ corresponds to the positive lenses L56 and L60. The negative lens $L_{n2}$ corresponds to the negative lens L52, and the positive lens $L_{p2}$ corresponds to the positive lens L53.

Third Embodiment

A zoom lens of a third embodiment includes, in order from the enlargement conjugate side to the reduction conjugate side, a first lens unit G1 having a negative lens, a second lens unit G2 having a negative lens, a third lens unit G3 having a positive lens, a fourth lens unit G4 having a negative lens, a fifth lens unit G5 having a positive lens, and a sixth lens unit G6 having a positive lens, and a stop STO between the third lens unit and the fourth lens unit. In zooming, the first lens unit G1 to the fifth lens unit G5 are moved on the optical axis, and the sixth lens unit G6 is fixed. The first lens unit G1 includes, in order from the enlargement conjugate side, lenses L71 to L73 each having a negative refractive index. The second lens unit G2 includes a lens L74 having a negative power. The third lens unit G3 includes a lens L75 having a negative refractive index, a lens L76 having a positive refractive index, and a lens L77 having a negative refractive index. The fourth lens unit G4 includes, in order from the enlargement conjugate side, a positive lens L78 having a positive power, a lens L79 having a negative power, a lens L80 having a positive power. The fifth lens unit G5 includes, in order from the enlargement conjugate side, a lens L81 having a negative power, a lens L82 having a positive power, a lens L83 having a negative power, a lens L84 having a positive power, a lens L85 having a positive power, and a lens L86 having a positive power. The sixth lens unit G6 includes a lens L87 having a positive power. The optical system of the third embodiment is applied to a zoom lens, and other structure and operations are similar to those of the first embodiment. The negative lens $L_{n1}$ corresponds to the negative lens L75, the positive lens $L_{p1}$ corresponds to the positive lenses L82, L84, and L86. There is no negative lens $L_{n2}$. The positive lens $L_{p2}$ corresponds to the positive lens L80.

Thus, each embodiment can properly correct a chromatic aberration, and realizes an optical system suitable for a liquid crystal projector having a good optical performance over the entire screen. In addition, each embodiment can realize an optical system suitable for an image pickup apparatus, such as a video camera, a film camera, and a digital camera, configured to form image information on a charged coupled device (photoelectric conversion element), such as a CCD camera and a CMOS sensor.

Numerical examples 1-3 respectively corresponding to the first to third embodiments will be illustrated below. In each numerical example, "i" denotes an order of the optical surface from the enlargement conjugate side (front side), "ri" denotes a radius of curvature of an i-th optical surface (i-th surface), "di" denotes a separation between the i-th surface and the i+1-th surface. "ndi" and "vdi" are a refractive index and an abbe number of the i-th optical element based on the d line, respectively. In addition, "f" denotes a focal length, "Fno" denotes an F number, and a value of "d" closest to the enlargement conjugate side in each of the numerical examples 1-3 is a distance from a screen surface to the lens surface closest to the enlargement conjugate side. The four surfaces closest to the reduction conjugate side in the numerical examples 1-3 are plane surfaces that form a glass block P. Moreover, the aspheric shape is represented by the following equation, where "k" is a conical constant, "A," "B," "C," and "D" are aspheric coefficients, "x" is a displacement in the optical axis direction from a surface vertex at a position of a height h from the optical axis, and "r" is a paraxial radius of curvature:

$$x = (h^2/r)/[1+[1-(1+k)(h/R)^2]^{1/2}]+Ah^4+Bh^6+Ch^8+Dh^{10}$$

For example, a representation of "E-Z" means "$10^{-Z}$". In the numerical examples 1-3, numerical values corresponding to the conditional equations (1) to (10) will be illustrated below:

Numerical Example 1 f = 11.1 ω = 49.7° Fno = 2.0
(A) NUMERICAL TABLE 1

| i | r | d | nd | ν | θgF |
|---|---|---|----|---|-----|
| screen | 0 | 1050 | | | |
| 1 | 122.38 | 6.00 | 1.834 | 37.2 | 0.578 |
| 2 | 89.84 | 10.23 | | | |
| 3 | 164.87 | 9.95 | 1.497 | 70.2 | 0.530 |
| 4 | 1248.23 | 0.10 | | | |

-continued

| i | r | d | nd | ν | θgF |
|---|---|---|---|---|---|
| *5 | 75.23 | 3.50 | 1.806 | 40.9 | 0.570 |
| 6 | 38.60 | 10.11 | | | |
| 7 | 82.42 | 3.00 | 1.773 | 49.6 | 0.552 |
| 8 | 28.95 | 11.81 | | | |
| 9 | 0 | 2.20 | 1.773 | 49.6 | 0.552 |
| 10 | 39.76 | 9.07 | | | |
| 11 | −166.87 | 8.14 | 1.648 | 33.8 | 0.595 |
| 12 | −31.12 | 2.50 | 1.773 | 49.6 | 0.552 |
| 13 | −221.76 | 13.68 | | | |
| 14 | −76.28 | 2.70 | 1.808 | 22.8 | 0.631 |
| 15 | 43.58 | 14.47 | 1.740 | 28.3 | 0.607 |
| 16 | −90.10 | 0.10 | | | |
| 17 | 88.22 | 11.15 | 1.654 | 39.7 | 0.574 |
| 18 | −79.40 | 60.76 | | | |
| 19 (STOP) | 40.83 | 6.63 | 1.596 | 39.2 | 0.580 |
| 20 | −31.64 | 3.19 | 1.757 | 47.8 | 0.548 |
| 21 | 15.71 | 6.81 | 1.699 | 30.1 | 0.603 |
| 22 | 67.33 | 11.79 | | | |
| 23 | 43.69 | 5.74 | 1.487 | 70.2 | 0.530 |
| 24 | −45.51 | 1.80 | 1.883 | 40.8 | 0.567 |
| 25 | 36.68 | 10.55 | 1.497 | 81.6 | 0.538 |
| 26 | −22.73 | 0.10 | | | |
| 27 | −29.12 | 1.90 | 1.883 | 40.8 | 0.567 |
| 28 | 38.72 | 7.63 | 1.729 | 54.7 | 0.544 |
| 29 | −131.39 | 0.10 | | | |
| *30 | 118.27 | 7.61 | 1.583 | 59.4 | 0.543 |
| *31 | −48.77 | 0.10 | | | |
| 32 | 238.40 | 11.58 | 1.497 | 81.6 | 0.538 |
| 33 | −37.31 | 2.50 | | | |
| 34 | 0 | 43.00 | 1.517 | 64.2 | — |
| 35 | 0 | 5.00 | | | |
| 36 | 0 | 23.00 | 1.805 | 25.4 | — |
| 37 | 0 | 6.51 | | | |

(B) ASPHERIC DATA

| i | K | A | B | C | D |
|---|---|---|---|---|---|
| 5 | 0 | 2.027E-06 | −7.383E-10 | 4.952E-13 | −1.116E-16 |
| 30 | 0 | −3.296E-07 | 2.974E-10 | −7.255E-13 | −5.266E-16 |
| 31 | 0 | 4.741E-06 | 1.886E-09 | 1.230E-12 | −3.165E-15 |

(C) CONDITIONAL EQUATIONS

EQUATION (1) = 1.808
EQUATION (2) = 0.025
EQUATION (3) = 3.04
EQUATION (4) = 81.6
EQUATION (5) = 0.031
EQUATION (6) = 2.70
EQUATION (7) = 0.001
EQUATION (8) = 0.548
EQUATION (9) = 0.603
EQUATION (10) = 4.96

Numerical Example 2 f = 11.1 ω = 49.7° Fno = 2.0
(A) NUMERICAL TABLE 2

| i | r | d | nd | ν | θgF |
|---|---|---|---|---|---|
| screen | 0 | 1050 | | | |
| 1 | 129.28 | 6.00 | 1.834 | 37.2 | 0.578 |
| 2 | 74.63 | 15.54 | | | |
| 3 | 289.88 | 8.39 | 1.497 | 81.6 | 0.538 |
| 4 | −593.08 | 0.10 | | | |
| *5 | 64.56 | 6.50 | 1.699 | 30.1 | 0.570 |
| 6 | 79.91 | 3.00 | 1.773 | 49.6 | 0.552 |
| 7 | 29.26 | 12.28 | | | |
| 8 | 141.11 | 2.20 | 1.773 | 49.6 | 0.552 |
| 9 | 27.15 | 12.46 | | | |
| 10 | −68.35 | 6.27 | 1.532 | 48.9 | 0.563 |
| 11 | −32.28 | 2.50 | 1.788 | 47.4 | 0.556 |
| 12 | 278.14 | 14.55 | | | |
| 13 | −1177.44 | 3.50 | 1.923 | 18.9 | 0.649 |
| 14 | 49.58 | 11.46 | 1.805 | 25.4 | 0.616 |
| 15 | −140.69 | 0.10 | | | |
| 16 | 97.90 | 13.66 | 1.654 | 39.7 | 0.574 |
| 17 | −70.96 | 58.65 | | | |
| 18 (STOP) | 37.37 | 5.93 | 1.613 | 37.0 | 0.586 |
| 19 | −36.62 | 1.50 | 1.773 | 49.6 | 0.552 |
| 20 | 16.00 | 5.52 | 1.699 | 30.1 | 0.603 |
| 21 | 48.80 | 11.92 | | | |
| 22 | 37.43 | 7.60 | 1.487 | 70.2 | 0.530 |
| 23 | −45.91 | 3.00 | 1.883 | 40.8 | 0.567 |
| 24 | 35.73 | 12.45 | 1.497 | 81.6 | 0.538 |
| 25 | −24.15 | 0.10 | | | |
| 26 | −33.72 | 1.90 | 1.883 | 40.8 | 0.567 |
| 27 | 38.88 | 7.67 | 1.729 | 54.7 | 0.544 |
| 28 | −200.00 | 0.10 | | | |
| *29 | 88.99 | 7.60 | 1.583 | 59.4 | 0.543 |
| *30 | −59.68 | 0.10 | | | |
| 31 | 171.66 | 12.46 | 1.497 | 81.6 | 0.538 |
| 32 | −38.49 | 2.50 | | | |
| 33 | 0 | 43.00 | 1.517 | 64.2 | — |
| 34 | 0 | 5.00 | | | |
| 35 | 0 | 23.00 | 1.805 | 25.4 | — |
| 36 | 0 | 6.51 | | | |

-continued

(B) ASPHERIC DATA

| i  | K | A         | B          | C          | D          |
|----|---|-----------|------------|------------|------------|
| 5  | 0 | 2.409E−06 | −5.777E−10 | 5.989E−13  | −7.832E−17 |
| 29 | 0 | −5.806E−07| 1.215E−09  | −1.591E−12 | −1.461E−15 |
| 30 | 0 | 4.859E−06 | 2.300E−09  | 1.646E−12  | −5.258E−15 |

(C) CONDITIONAL EQUATIONS

EQUATION (1) = 1.923
EQUATION (2) = 0.038
EQUATION (3) = 4.60
EQUATION (4) = 81.6
EQUATION (5) = 0.031
EQUATION (6) = 2.80
EQUATION (7) = 0.000
EQUATION (8) = 0.552
EQUATION (9) = 0.603
EQUATION (10) = 4.96

Numerical Example 3

(A) NUMERICAL TABLE 3
$f = 12.7 \sim 14.4 \quad \omega = 37.0° \sim 33.7° \quad Fno = 2.0$

| UNIT   | i        | r       | d     | nd    | ν    | θgF   |
|--------|----------|---------|-------|-------|------|-------|
| screen | 0        | 1210    |       |       |      |       |
| 1      | 1        | 46.92   | 3.50  | 1.773 | 49.6 | 0.552 |
|        | 2        | 31.39   | 6.14  |       |      |       |
|        | 3        | 43.68   | 3.50  | 1.773 | 49.6 | 0.552 |
|        | 4        | 26.32   | 7.62  |       |      |       |
|        | *5       | 0       | 4.00  | 1.497 | 70.2 | 0.530 |
|        | *6       | 67.22   | d1    |       |      |       |
| 2      | 7        | 422.83  | 3.00  | 1.755 | 52.3 | 0.548 |
|        | 8        | 45.28   | 24.75 |       |      |       |
| 3      | 9        | −98.15  | 3.00  | 1.808 | 22.8 | 0.631 |
|        | 10       | 52.28   | 12.78 | 1.717 | 29.5 | 0.605 |
|        | 11       | −73.71  | 0.10  |       |      |       |
|        | 12       | 105.49  | 10.91 | 1.699 | 30.1 | 0.603 |
|        | 13       | −77.58  | d2    |       |      |       |
| 4      | 14       | 1409.79 | 2.37  | 1.750 | 35.3 | 0.582 |
|        | 15       | −56.57  | 0.14  |       |      |       |
|        | 16 (STOP)| −49.08  | 1.50  | 1.801 | 35.0 | 0.586 |
|        | 17       | 20.13   | 3.74  | 1.805 | 25.4 | 0.616 |
|        | 18       | 112.47  | d3    |       |      |       |
| 5      | 19       | 70.51   | 1.50  | 1.839 | 37.2 | 0.578 |
|        | 20       | 27.04   | 10.07 | 1.497 | 81.6 | 0.538 |
|        | 21       | −19.60  | 0.21  |       |      |       |
|        | 22       | −19.53  | 1.62  | 1.834 | 37.2 | 0.578 |
|        | 23       | 74.87   | 8.16  | 1.497 | 81.6 | 0.538 |
|        | 24       | −38.76  | 0.10  |       |      |       |
|        | 25       | −468.22 | 4.77  | 1.487 | 70.2 | 0.530 |
|        | 26       | −57.06  | 0.10  |       |      |       |
|        | 27       | 249.77  | 11.65 | 1.497 | 81.6 | 0.538 |
|        | 28       | −37.60  | d4    |       |      |       |
| 6      | 29       | 106.30  | 3.81  | 1.812 | 25.4 | 0.616 |
|        | 30       | 0       | 1.88  |       |      |       |
|        | 31       | 0       | 32.00 | 1.517 | 64.2 |       |
|        | 32       | 0       | 5.00  |       |      |       |
|        | 33       | 0       | 21.00 | 1.805 | 25.4 |       |
|        | 34       | 8.13    |       |       |      |       |

|    | WIDE END | TELEPHOTO END |
|----|----------|---------------|
| d1 | 13.08    | 5.70          |
| d2 | 54.81    | 59.77         |
| d3 | 7.96     | 3.63          |
| d4 | 0.10     | 3.19          |

-continued (B) ASPHERIC DATA

| i | K | A | B | C | D |
|---|---|---|---|---|---|
| 5 | 0 | 3.756E−05 | −7.149E−08 | 8.587E−11 | −7.387E−14 |
| 6 | 0 | 3.357E−05 | −6.649E−08 | 1.090E−11 | 0.000E+00 |

(C) CONDITIONAL EQUATIONS

EQUATION (1) = 1.808
EQUATION (2) = 0.025
EQUATION (3) = 3.26
EQUATION (4) = 81.6
EQUATION (5) = 0.031
EQUATION (6) = 1.93
EQUATION (7) = 0.007
EQUATION (8) = x
EQUATION (9) = 0.616
EQUATION (10) = 3.76

Each embodiment can provide an optical system having a good optical performance over a screen by well correcting a chromatic aberration, such as a chromatic difference of magnification and axial chromatic aberration, which may occur with a wider angle of view.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-188460, filed Aug. 17, 2009, and 2010-156009, filed on Jul. 8, 2010, which are hereby incorporated by reference herein in their entirety.

What is claimed is:

1. An optical system comprising:
in order from an enlargement conjugate side to a reduction conjugate side via a largest air gap, a front unit having a negative power, and a rear unit having positive power, wherein the optical system satisfies the following conditions:

$$1.75 < Nd_{n1} < 2.05;$$

$$0.02 < \theta gF_{n1} - (0.6438 - 0.001682 \times vd_{n1}) < 0.08;$$

$$2.5 < |f_{n1}/F| < 5.0; \text{ and}$$

$$BF/F > 3.5,$$

where $f_{n1}$ represents a focal length of a negative lens in the front unit, $Nd_{n1}$ represents a refractive index of a material of the negative lens, $vd_{n1}$ represents an Abbe number of the material of the negative lens, $\theta gF_{n1}$ represents a partial dispersion ratio of the material of the negative lens, F represents a focal length of the optical system, and BF represents an air-equivalent back focus in the optical system.

2. The optical system according to claim 1, wherein at least one negative lens is located between a distance of $0.2 \, L_f$ and a distance of $0.7 \, L_f$ from a lens surface closest to the enlargement conjugate side toward the reduction conjugate side, where $L_f$ represents a distance on the optical axis from a lens surface closest to the enlargement conjugate side in the front unit to a lens surface closest to the enlargement conjugate side in the rear unit.

3. The optical system according to claim 1, wherein the optical system satisfies the following conditions:

$$75 < vd_{p1} < 99;$$

$$0.02 < \theta gF_{p1} - (0.6438 - 0.001682 \times vd_{p1}) < 0.08; \text{ and}$$

$$f_{p1}/F < 5,$$

where $f_{p1}$ represents a focal length of at least one positive lens in the rear unit, $vd_{p1}$ represents an Abbe number of a material of the at least one positive lens, and $\theta gF_{p1}$ represent a partial dispersion ratio of the material of the at least one positive lens.

4. The optical system according to claim 1, wherein the optical system satisfies:

$$|Q_p - Q_n| < 0.02,$$

where $f_{pi}$ represents a focal length of an i-th positive lens counting from the enlargement conjugate side toward the reduction conjugate side, $\theta gF_{pi}$ represents a partial dispersion ratio of a material of the i-th positive lens, $f_{ni}$ represents a focal length of an i-th negative lens counting from the enlargement conjugate side toward the reduction conjugate side, and $\theta gF_{ni}$ represents a partial dispersion ratio of a material of the i-th negative lens, $\Sigma(\theta gF_{pi}/f_{pi})$ represents a sum of a value $(\theta gF_{pi}/f_{pi})$ with respect to all positive lenses in the optical system, and $\Sigma(\theta gF_{ni}/f_{ni})$ represents a sum of a value $(\theta gF_{ni}/f_{ni})$ with respect to all negative lenses in the optical system, $\Sigma(1/f_{pi})$ represents a sum of a value $(1/f_{pi})$ with respect to the all positive lenses in the optical system, and $\Sigma(1/f_{ni})$ represents a sum of a value $(1/f_{ni})$ with respect to the all negative lenses in the optical system, $Q_p = \Sigma(\theta gF_{pi}/f_{pi})/\Sigma(1/f_{pi})$ and $Q_n = \Sigma(\theta gF_{ni}/f_{ni})/\Sigma(1/f_{ni})$, where $Q_p$ represents an average anomalous dispersion value of the all positive lenses in the optical system, and $Q_n$ represents an average anomalous dispersion value of the all negative lenses included in the optical system.

5. The optical system according to claim 1, including:
a negative lens A that is located at a position in a range of a distance of ±0.1 L from a lens surface closest to the enlargement conjugate side in the rear unit; and
a positive lens B that is located at a position in the range of the distance of ±0.1 L from the lens surface closest to the enlargement conjugate side in the rear unit, the position of the positive lens B being different from the position of the negative lens A, where L denotes a distance from a lens surface closest to the enlargement conjugate side in the front unit to the lens surface closest to the reduction conjugate side in the rear unit, wherein the optical system satisfies the following conditions:

$$\theta gF_{n2} < 0.560; \text{ and}$$

$$\theta gF_{p2} > 0.590,$$

where $\theta gF_{n2}$ represents a partial dispersion ratio of a material of the negative lens A, and $\theta gF_{p2}$ represents a partial dispersion ratio of a material of the positive lens B.

6. An optical apparatus comprising an optical system comprising:
   in order from an enlargement conjugate side to a reduction conjugate side via a largest air gap, a front unit having a negative power, and a rear unit having positive power,
   wherein the optical system satisfies the following conditions:

$$1.75 < Nd_{n1} < 2.05;$$

$$0.02 < \theta gF_{n1} - (0.6438 - 0.001682 \times vd_{n1}) < 0.08;$$

$$2.5 < |f_{n1}/F| < 5.0; \text{ and}$$

$$BF/F > 3.5,$$

where $f_{n1}$ represents a focal length of a negative lens in the front unit, $Nd_{n1}$ represents a refractive index of a material of the negative lens, $vd_{n1}$ represents an Abbe number of the material of the negative lens, $\theta gF_{n1}$ represents a partial dispersion ratio of the material of the negative lens, F represents a focal length of the optical system, and BF represents an air-equivalent back focus in the optical system.

7. The optical system according to claim 5, wherein,
   when multiple negative lenses, including the negative lens A, are positioned in the range of the distance of ±0.1 L from the lens surface closest to the enlargement conjugate side in the rear unit, the negative lens A has the strongest power among the multiple negative lenses, and
   when multiple positive lenses, including the positive lens B, are positioned in the range of the distance of ±0.1 L from the lens surface closest to the enlargement conjugate side in the rear unit, the positive lens B has the strongest power among the multiple positive lenses.

\* \* \* \* \*